United States Patent
Richman

[15] 3,656,053
[45] Apr. 11, 1972

[54] OSCILLOSCOPE READER AND CALIBRATION SYSTEM

[72] Inventor: Peter Richman, Lexington, Mass.
[73] Assignee: Teradyne Applied Systems, Inc., Chicago, Ill.
[22] Filed: Feb. 2, 1970
[21] Appl. No.: 7,659

[52] U.S. Cl. ............................................. 324/20, 324/121
[51] Int. Cl. ................................. G01r 31/22, G01r 13/20
[58] Field of Search ................ 324/20, 99, 121; 250/217 CR

[56] References Cited

UNITED STATES PATENTS

| | | | |
|---|---|---|---|
| 2,967,999 | 1/1961 | Gabbelein | 324/99 |
| 3,028,544 | 4/1962 | Stone | 324/20 |
| 2,856,129 | 10/1958 | Baker | 250/217 X |
| 3,275,746 | 9/1966 | Beltrami | 250/217 X |

Primary Examiner—Alfred E. Smith
Attorney—Alter, Weiss & Whitesel

[57] ABSTRACT

An oscilloscope reader and calibration system. The system comprises a closed loop including signal generator means for feeding variable signals into the oscilloscope. Light sensitive transducer means are arranged to detect the desired parameters of the oscilloscope displayed signal. Responsive thereto control signals are generated which vary the input signal to the generator and thus change the output signal from the generator. The output signal serves as the calibration input to the scope. When a null is obtained, no signal variation occurs. In the null condition the error in calibration is easily measured or utilized for corrective action even by unskilled personnel.

35 Claims, 10 Drawing Figures

Patented April 11, 1972

INVENTOR
PETER RICHMAN

BY
Alter and Weiss
ATTORNEYS

Patented April 11, 1972

POSSIBLE OSCILLOSCOPE
DISPLAYS

CONTROL SIGNAL
GENERATOR

INVENTOR
PETER RICHMAN

BY
Alter and Weiss
ATTORNEYS

INVENTOR
PETER RICHMAN

Patented April 11, 1972

INVENTOR
PETER RICHMAN

BY
*Alter and Weiss*
ATTORNEYS

OSCILLOSCOPE READER AND CALIBRATION SYSTEM

This invention relates to oscilloscope reader and calibration systems and more particularly to such systems used for determining the calibration error of oscilloscopes.

Since its introduction as a tool for use by the electronic technician, the oscilloscope has continually increased in importance in the arsenal of equipment used by the electronic technicians both in the laboratory and in production. The oscilloscope, of course, enables the visual, minute examination of the characteristics of voltage and current wave forms. This enables, among other things, the relationships between a number of such wave forms to be compared and individual wave forms to be analyzed as the circuits involved are investigated or tested.

However, the versatility obtained through the capability of offering visual display has at the same time proved to be an inadequacy when it comes to calibrating the oscilloscopes. Highly qualified people are presently necessary to perform the calibration of the oscilloscope, because until now sophisticated judgment has been required to obtain proper calibration.

For example, the most usual mode of calibrating oscilloscopes at the present time is for the operator to couple a certain amplitude voltage signal into the input of the scope to visually check the displayed signal to verify the height of the signal. Thus, if a standard 2 volt amplitude signal is applied to the vertical input and the controls of the oscilloscope are set at 4 centimeters per volt, the signal amplitude displayed on the oscilloscope should be eight centimeters on the oscilloscope grid. The operator visually compares the actual amplitude of the trace on the oscilloscope to the actual signal applied at the input. If the comparison reveals a discrepancy, then the question arises as to whether the standard signal is erroneous or whether there is error in the calibration of the oscilloscope.

Alternatively, the person calibrating the oscilloscope may vary the generator amplitude until the signal trace is at a certain amplitude. He then can measure the input signal to determine its value and to thus ascertain the calibration error of the scope. This again requires using personal judgement to determine when the trace is at the desired height.

Thus, besides the astigmatic difficulties which arise on such calibration tests, it is necessary to constantly recheck the standard input.

Another problem involved in manually adjusting the calibrated oscilloscope is the DC drift problem and the AC droop problem caused by such things as components warming up and changing values, for example. Thus, calibration of the oscilloscope as presently done requires highly trained technicians.

Accordingly, it is a purpose of the present invention to provide an oscilloscope reader and calibration system wherein the system comprises a closed loop utilizing an automatic read out device. The automatic read out device generates control signals that are used to control an input signal generator which provides the test signal to the oscilloscope being calibrated.

It is another object of the present invention to provide an oscilloscope calibration capability that is independent of the drift of the oscilloscope amplifier circuitry.

It is yet another object of the present invention to make possible the determination of field measurements such as peak to peak amplitudes as displayed on the oscilloscope face without a human operator reading the display on the oscilloscope.

It is yet a further object of the present invention to calibrate the amplitude response or the time base of an oscilloscope system wherein the operator functions merely to turn scope controls but not to read the oscilloscope display or make value judgements as to the results read on the oscilloscope.

An embodiment of the invention includes a transducer arrangement for optically determining the parameters of signals displayed on an oscilloscope. A control signal generating circuit fed by the outputs of the transducer arrangement generates digital control signals as a function of the signal displayed on the oscilloscope face.

Means are provided for converting the digital control signals to analog control signals, and transmitting the analog control signals to an amplitude programable oscillator or signal generator. The means for transmitting the analog control signals to the oscillator may include integrating circuitry.

The output of the oscillator is fed to an amplitude range circuit arrangement which operates to provide different ranges of operation as a function of high or low limits of the analog control signal. The output of the oscillator after going through the amplitude range circuit arrangement is fed through a buffer amplifier into the input of the oscilloscope being calibrated.

Thus, the output of the signal generator or oscillator is a function of the calibration error determined by the transducer arrangement in cooperation with the control signal generator. The signal generator output null point is reached when the loop is stabilized. At that point, the output of the oscillator is the signal necessary to generate the desired signal display on the scope. A calibration error at the null point can be used to properly correct the calibration of the scope.

The above mentioned and other objects and features of this invention together with the manner of obtaining them will become more apparent, and the invention itself will be best understood by making reference to the following description of an exemplary embodiment of the invention taken in conjunction with the accompanying drawings, wherein.

Figure 1:
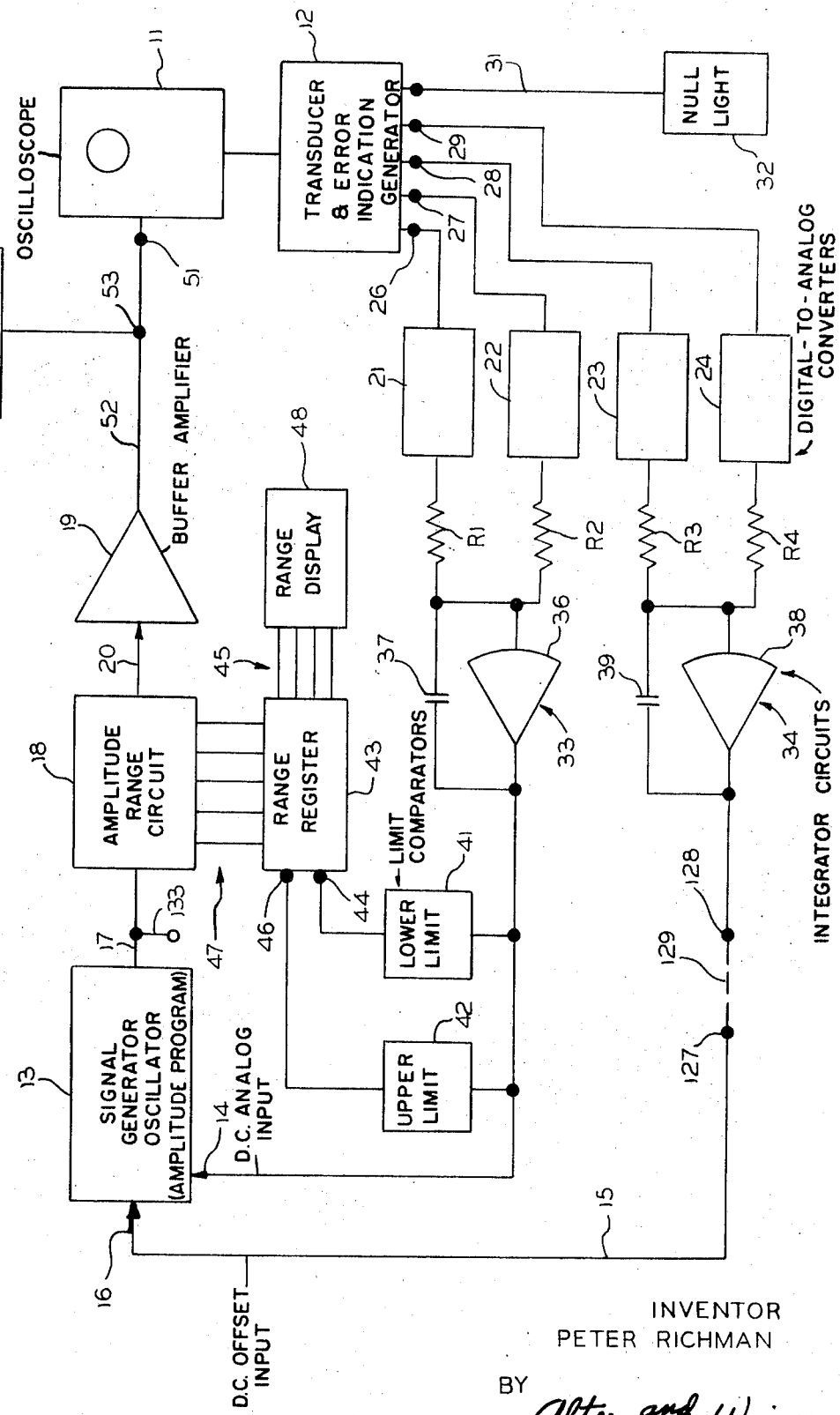
FIG. 1 shows in block diagram form a system using an exemplary oscilloscope reader and calibration system.

Referring now to the Figures, FIG. 1 shows in block diagram form a preferred system for oscilloscope reading and calibration. The oscilloscope system comprises a closed loop. The loop initiates and terminates at the oscilloscope 11 being tested or calibrated.

Means are provided for automatically determining the parameters of the display on the scope. These means are indicated in FIG. 1 as part of the transducer and error indication generator of block 12. The equipment of block 12 also provides coded control signals as a function of the display on the scope, as will be explained further herein. In the embodiment disclosed, the control signals from block 12 are digital signals.

The active controllable variable of the loop is the amplitude programable signal generator or oscillator 13. The oscillator 13 is a type wherein the output amplitude is a function of the control signals placed on the input of the oscillator. The control signals utilized by the oscillator 13 in one exemplary circuit are analog signals. Thus, at one input, 14, a DC analog signal is applied. The amplitude of the alternating current output is varied as a function of the input signal at 14. The output signal of the oscillator 13 is shifted as a function of the DC offset input 16.

Means may be provided for conforming the amplitude of the oscillator output signals to the ranges of the oscilloscope equipment being calibrated. Thus, as shown in FIG. 1, the output of the oscillator 13 appears on line 17 and is there transmitted to means for varying the range of the output signals such as the amplitude range circuits 18. The circuitry 18 may comprise series connected voltage dividers with the series sections coupled into the oscillator output by either relays or electronic switching circuitry, such as known to those skilled in the art.

Means are provided for coupling the output of the amplitude range circuits to the oscilloscope input. More particularly, buffer amplifier 19 is shown between amplitude range circuits 18 and the oscilloscope 11.

Means, such as digital-analog-converter means, shown as blocks 21, 22, 23 and 24 are provided for converting the digital output of the block 12 to analog signals. The number of conversion circuits, of course, depends on the number of control signals required. For example, the four conversion circuits are necessary in this case because four control signals are obtained from generator 12. The four control signals are used to supervise the following selective functions; increase AC, decrease AC, increase DC and decrease DC. These are outputs 26, 27, 28 and 29 of the error control circuit generator portion of block 12, respectively.

A fifth output 31 is shown coming from the block 12. This is the output that is energized responsive to the system reaching equilibrium or in other words, when there is a null point reached. The output 31 may operate a null light circuit 32 to visually signal that the null condition has been achieved.

Means are provided for historically adding the signals from the converters so that transients are converted to steady state values. More particularly, integrator circuits 33 and 34 are provided for coupling the AC and DC control signals to the oscillator 13, respectively. Circuit 33 comprises an operational amplifier 36 bridged by the feedback capacitor 37. The dual inputs to the integrating circuits 33 are DC coupled from digital analog converters 21, 22 through resistors R1 and R2, respectively, Similarly, integrating circuit 34 comprises operational amplifier 38 bridged by feedback capacitor 39. The inputs to circuit 34 are DC coupled from digital-analog-converters 23 and 24 through resistors R3 and R4, respectively.

The output of the operational amplifier 36 is also used for controlling the amplitude range circuits 18. If the output of the operational amplifier 36 passes either a preset upper limit or a preset lower limit determined by the limit comparators 41 and 42, respectively, for the high and low limits, then a signal from these circuits at inputs 44 and 46, respectively, causes the range register circuit 43 to provide control signals.

Responsive to the inputs at 44 and 46, switching control signals are transmitted to the amplitude range circuits 18 to initiate range changes. The changes in the range circuit is important, for example, when the amplitude programable oscillator 13 has given range, say for example, 10:1, over which its output amplitude may be varied directly by the input received from the integrator 33. The variation in the range circuit assures both linear operation and a proper low signal to noise ratio.

Means are provided for determining in which range the feedback circuit is operating. More particularly, a range display circuit 48 may be provided coupled to the range register circuit 43 to visually indicate at which range the amplitude range circuit is operating.

Thus, in response to the amplitude control signal from the output of operational amplifier 36, the oscillator 13 supplies at its output conductor 17, a signal which is connected to the amplitude range circuits 18. The output of the amplitude range circuit 18 is coupled to the buffer amplifier through conductor 20; and the output of buffer amplifier 19 is coupled to the input terminal 51 of scope 11 through conductor 52.

Thus, ignoring DC scope offsets for the moment, if the transducer circuitry of block 12 supplies a signal indicating an error in the amplitude of the display on the scope, versus a predetermined desired amplitude, the logic circuitry of block 12 which generates digital command signals indicates that the AC input to the scope is either too large or too small. The control signal commands a decrease or increase in the AC signal. These control signals are provided at terminals 26 and 27 of circuitry of block 12, and are used to provide a control signal for supervising the amplitude of the AC output of the oscillator 13.

In this manner, the AC amplitude feedback loop, incorporating the component blocks 12, 21, 22, 33, 13, 18 and 19 causes the system to null. At the null point, the amplitude of the displayed signal elicits no response from terminals 26, 27 of the reader and error indication equipment of block 12. When the system is nulled, then there is no command to increase or decrease the AC signal level, or the superimposed DC signal level, since it was assumed correct. Instead, a "null" signal is generated at the null terminal 31. The "null" signal activates the null light 32. At this point, a measurement at terminal 51 provides the calibration error information that is required. That is, in the example given, the precise amount of the calibration error of the oscilloscope vertical amplifier is provided.

If, for example, the scope is set to 10 volts per centimeter, and if the light sensitive transducers attached to the face of the oscilloscope and indicated by block 12 are arranged for four centimeters peak-to-peak trace deflection, then the oscillator 13 will receive signal variation commands by the closed loop just described until its output results in exactly a 4 centimeter deflection of the trace on the face of the oscilloscope. The AC amplitude of the signal at terminal 51, when the null is achieved, determines the calibration accuracy of the scope. Clearly, a 40 volt peak-to-peak signal at terminal 51 indicates that the scope is exactly within calibration since 10 volts per centimeters times 4 centimeters is 40 volts. Any deviation from the 40 volt peak-to-peak value indicates an error deviation of the scope gain from the nominal volts per centimeter. A comparison between the measured deviation and a preset allowable deviation figure based on the specifications of the oscilloscope determines the acceptability of the performance of the oscilloscope on the range of the oscilloscope being calibrated. Thus, the judgement required on behalf of the operator is minimized, and clearly a non-skilled operator can perform the calibration check using the equipment set forth.

The measurement of the peak-to-peak AC voltage at terminal 51 can be accomplished by any means well known to those skilled in the art. For undistorted signals from the oscillator, amplitude range circuits and buffer amplifier, an average or R.M.S. measurement properly scaled in terms of the mathematical relationship between it and peak-to-peak values will be satisfactory. When wave forms with greater than one or two tenths of a per cent of distortion are provided at the output of amplifier 19, a peak-to-peak measurement is required. However, there is no reason to expect the output of buffer amplifier 19 to have more than a few tenths of a per cent distortion, so that the conventional average AC digital volt meter may be employed to read the voltage applied to the scope at the terminal 51. If need be, in order to utilize segment wave form generators for the oscillator 13, a peak-to-peak measurement system for the wave at terminal 51 may be utilized.

The measurement equipment is indicated by block 49 connected to line 52 at point 53. This block could provide an output display and digital encoded amplitude data. The digital data may also utilize comparators and/or a digital computer to determine whether the scope is within the calibration requirements on the range being used.

The operation of the block diagram of FIG. 1, just described, is applicable to situations in which there is no DC drift in the oscilloscope, and in which DC level of the vertical display is exactly centered. This, as any person who has used an oscilloscope well knows is a hypothetical situation. In actual practice, the operator spends a good deal of time varying zero for the typical scope before and during a calibration. As the zero position of the beam shifts, it is difficult to take accurate, meaningful readings of the peak-to-peak amplitude displayed on the scope.

Thus, the discussion hereinbefore has not taken into account the constant readjustment of the vertical amplifier zero control that is usually necessary to obtain the positive and negative peaks at symmetrical positions with respect to the zero axis of the grid lines.

The vertical amplifier zero control is supervised by the control signals generated by block 12 and supplied at terminals 28 and 29, the increase and decrease DC signal terminals, respectively. These signals are applied to the digital-to-analog converters 23 and 24. The output of these two converters furnish negative and positive potentials to the input resistors R3 and R4, respectively, of the integrator 34. The output of the integrator 34 is applied to the "DC offset" 16 through wire 15. Thus, a DC offset is provided in the combined AC–DC signal output from the oscillator that is proportional to the input command applied to the terminal 16.

When both the range circuit 18 and the buffer 19 are DC coupled, the DC output of the oscillator 13 superimposed on the AC output signal is transmitted without change with whatever gain is applied to the AC signal by the amplifier 19. The DC is applied to terminal 51 of the scope, and if it has DC coupled circuitry, the beam is properly positioned. The beam zero position is reflected in the error generator output signals on terminals 28 and 29 of block 12 to close the DC control loop.

Thus, in a manner very analogous to that employed for the AC signal amplitude control of the beam pattern on the face of the scope, DC applied to the scope is adjusted so as to always maintain the beam centered vertically in an automatic manner so that the AC loop may perform satisfactorily. The two loops, the AC and the DC, function simultaneously until a null is reached, in a fraction of a second. It is seen that a key portion of the system is the transducer and control signal or error indication generator of block 12.

Figure 2:
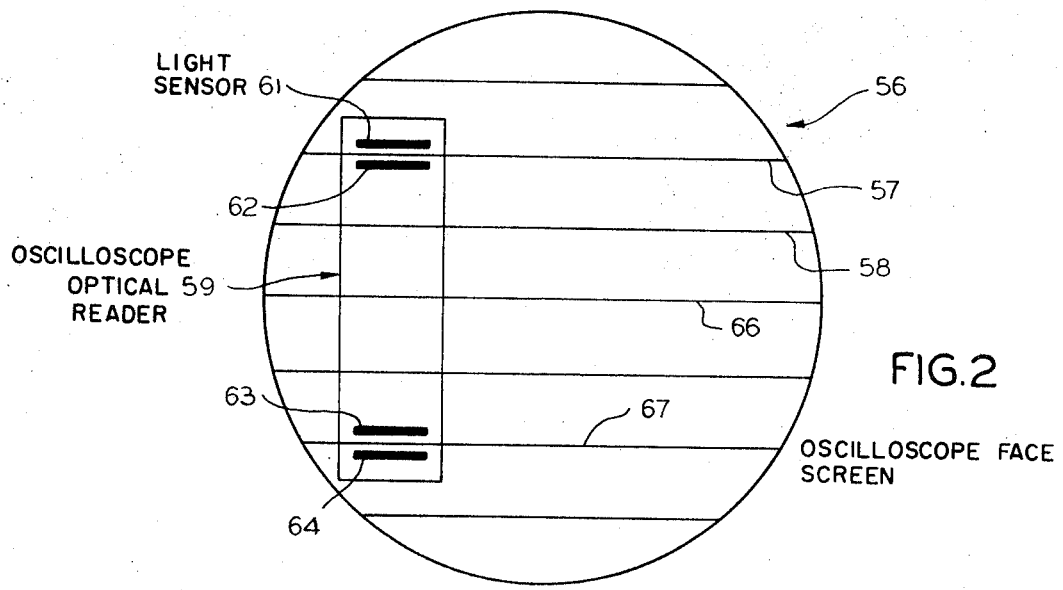
FIG. 2 shows the face of an exemplary oscilloscope with the transducer in place on the face of the oscilloscope.

FIG. 2 shows a typical oscilloscope face, indicated generally as 56. The scope face is shown for exemplary purposes as being round. It should be understood, of course, that the face can be, modified, round, rectangular, or any convenient shape and the equipment of the invention will still operate in the manner described.

The conventional horizontal grid lines are shown. Two such typical lines are indicated as 57 and 58. The vertical grid lines are omitted in order to simplify the drawings.

Means are provided for determining the parameters of the signal displayed on the scope face. More particularly, an oscilloscope face reader assembly 59 is shown attached to the scope face. The exemplary assembly 59 comprises four long thin horizontally disposed light sensitive sensors or transducers 61, 62, 63 and 64. These are shown in the exemplary embodiment as thin silicon solar cells. The heights (vertical direction) of these photocells is in the order of 0.010 to 0.020 of an inch and the width of the cells are in the order of ½ to 1 inch in the horizontal direction. The cell spacing of the pairs 61, 62 and 63, 64 is in the order of 0.005 of an inch, optimally.

It should be understood that while silicon solar cells are used in the example discussed, any other photo sensitive type device can be used. Similarly, the spacing and dimensions described are unique to the calibration example used.

As indicated, the four cells are grouped in two sets of two pairs. The upper two cells bracket the horizontal grid line 57, which is shown as being two divisions up from the center horizontal grid line 66. Similarly, the lower two cells 63 and 64 bracket the grid line 67 which is two divisions below the center grid line 66. Of course, it should be understood that additional cells may be employed to determine other amplitudes and parameters of the wave from being measured. Thus, the wave form in the oscilloscope screen that sheds light on cells 62 and 63 but not on 61 and 64, is exactly four divisions high. Similarly, it should be understood that the grid lines are used herein and assigned values for purposes of explaining the invention. In use, the actual zero line relative to the signal trace is fixed by the spacing of the transducer pairs, for example, independant of the grid mask on the scope face.

In use in peak-to-peak measuring, the reader assembly 59 is employed either with the oscilloscope time base set at a rate far faster than that of the time period of the wave displayed on the scope or else at a rate that is far slower than the time period of the wave displayed on the scope. In the first case, of course, the display will be a raster filling virtually all of the screen between peak amplitudes. In the second case, there will be a number of waves displayed across the screen and even if they are not stationary, there still will be enough time to measure the peaks that occur within the ½ to 1 inch width of the cells employed on the reader so that the cells will respond satisfactorily.

Thus, the reader assembly 59 may be used to sense when the peak-to-peak amplitude of the wave displayed on the screen is exactly the distance between lines 57 and 67. The accuracy of the reading is limited mainly by the physical size of the cells in the vertical direction and the spacing between cells of the upper and lower pair. These dimensions are small and may be adjusted at final assemblies of the readers to provide accuracies consistent with the calibration accuracy required for the scope itself.

Figure 3:
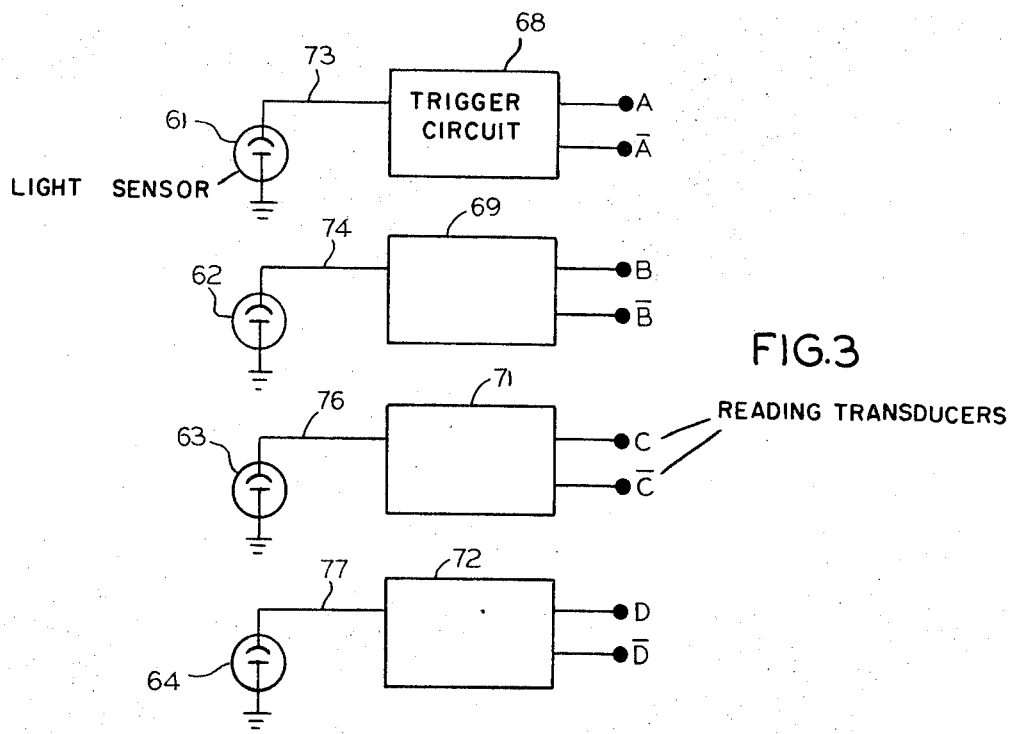
FIG. 3 shows in block diagram form the four transducers of FIG. 2 with associated output equipment.

Means are provided to obtain binary digital signals based on the readings obtained from the sensors attached to the face of the oscilloscope in FIG. 2. Such means are shown in FIG. 3 as blocks 68, 69, 71 and 72 attached to the sensors 61, 62, 63 and 64, respectively. The blocks contain amplifiers and fast acting trigger circuits for providing unambiguous binary outputs responsive to the operation of the sensors. Thus, sensor 61 is shown coupled to block 68 through cable wire 73. The output of the block 68 contains any well known trigger circuit, such as for example, a Schmidt trigger circuit, which provides the binary output A and $\overline{A}$. Similarly, sensor 62 is coupled to block 69 through cable wire 74 to provide binary outputs B and $\overline{B}$. Sensor 63 is coupled to block 71 through wire cable 76 to provide outputs C and $\overline{C}$, while sensor 64 is coupled to block 72 through cable wire 77 to provide outputs D and $\overline{D}$.

Here again, it should be emphasized that more sensors could be used, and the additional sensors would similarly be connected to amplifier and trigger circuits to provide coded outputs, such as binary outputs. Thus, when sensor 61 is illuminated by the displayed signal on the oscilloscope face, then the amplifier and Schmidt trigger circuitry of block 68 provides an output at A. Conversely, when sensor 61 is not illuminated by the display of the scope, then there is an output at $\overline{A}$ of block 68.

Figure 4:
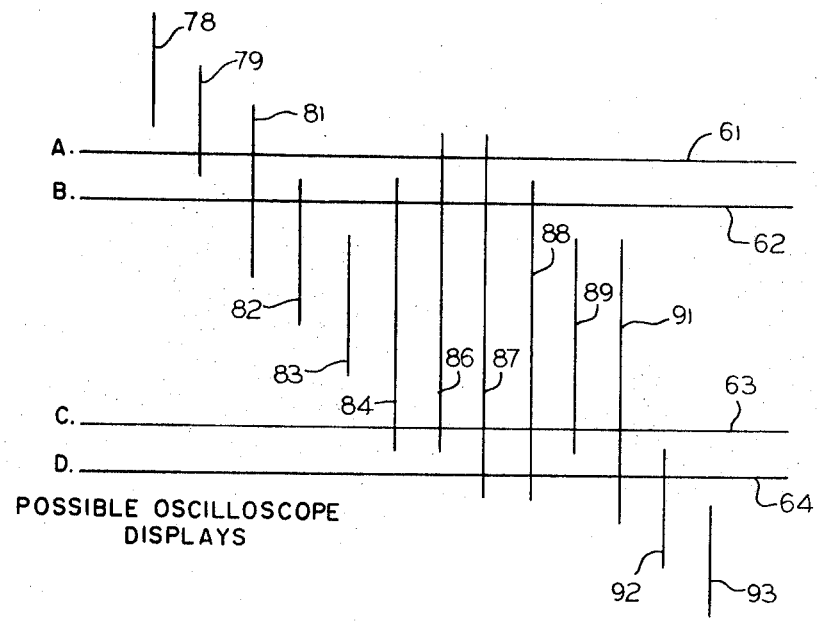
FIG. 4 illustrates various possibilities of the oscilloscope display responsive to scope input signals used in the vertical amplifier calibration.

As an example of the operation of the transducer and error control signal generator of block 12, FIG. 4 is utilized to show various logical situations which must be distinguished by the error generator under the assumption that a peak-to-peak AC signal superimposed on a DC signal is applied to the scope. Both of the AC and DC signals are independantly controllable in either digital type steps or analog type incident resolutions.

Thirteen specific separate situations for the peak-to-peak wave location and size are considered in the figure by utilizing the four sensor or cell locations designated as 61 thru 64 in FIG. 2. In actuality, there may be 15 separate situations. However, two of the situations; namely, the wave located merely between the sensors 61 and 62 or between sensors 63 and 64 require the same treatment as would be obtained in three other of the cases; that is, when the wave is above any of the sensors, when the wave is below any of the sensors, or when the wave is between the inner two sensors of the two separate pairs of sensors.

The thirteen situations are indicated by 13 vertical lines. They merely, of course, represent the wave amplitudes. In actual use, it should be understood that the scope pattern of the input wave will extend across the full width of the screen. Similarly, the location of the sensors 61, 62, 63 and 64 are represented in FIG. 4 by horizontal lines.

One case is shown as vertical line 78. In that case, the wave is above any of the sensors. The second case is shown as vertical line 79. Line 79 represents the case where only the top sensor detects the display. Line 81 represents the case where the top two sensors detect the display. Line 82 represents the case where the inner one of the top pair of sensors detects the illuminated display on the face of the oscilloscope. Line 83 represents the case when the display is between the two pairs of sensors. Line 84 represents the case where the inner ones of each pair of sensors detects the display. Line 86 represents the case where the top two and the inner one of the bottom pair of sensors detects the display. Line 87 represents the case where all four sensors detect the display. Line 88 represents the case where the bottom one of the top pair of sensors and the bottom two sensors detect a display. Line 89 represents the case where the inner one of the bottom pair of sensors detects the display. Line 91 represents the case where both of the bottom pair of sensors detect the display. Line 92 represents the case where only the bottom sensor detects the display, and line 93 represents the case where the display is below all of the sensors. For the thirteen cases indicated, the logical definitions are shown in Table I, which follows:

TABLE I

| Case | Wave No. | Representation | Action |
|---|---|---|---|
| 1 | 78 | $\bar{A}$ x $\bar{B}$ x $\bar{C}$ x $\bar{D}$ | Increase AC. |
| 2 | 79 | A x $\bar{B}$ x $\bar{C}$ x $\bar{D}$ | Decrease DC. |
| 3 | 81 | A x B x $\bar{C}$ x $\bar{D}$ | Decrease DC. |
| 4 | 82 | $\bar{A}$ x B x $\bar{C}$ x $\bar{D}$ | Increase AC. |
| 5 | 83 | $\bar{A}$ x $\bar{B}$ x $\bar{C}$ x $\bar{D}$ | Increase AC. |
| 6 | 84 | A x B x C x $\bar{D}$ | NULL. |
| 7 | 86 | A x B x C x $\bar{D}$ | Decrease AC. |
| 8 | 87 | A x B x C x D | Decrease AC. |
| 9 | 88 | $\bar{A}$ x B x C x D | Decrease AC. |
| 10 | 89 | $\bar{A}$ x $\bar{B}$ x C x $\bar{D}$ | Increase AC. |
| 11 | 91 | $\bar{A}$ x $\bar{B}$ x C x D | Increase DC. |
| 12 | 92 | $\bar{A}$ x $\bar{B}$ x $\bar{C}$ x D | Increase DC. |
| 13 | 93 | $\bar{A}$ x $\bar{B}$ x $\bar{C}$ x $\bar{D}$ | Increase AC. |

Figure 5:
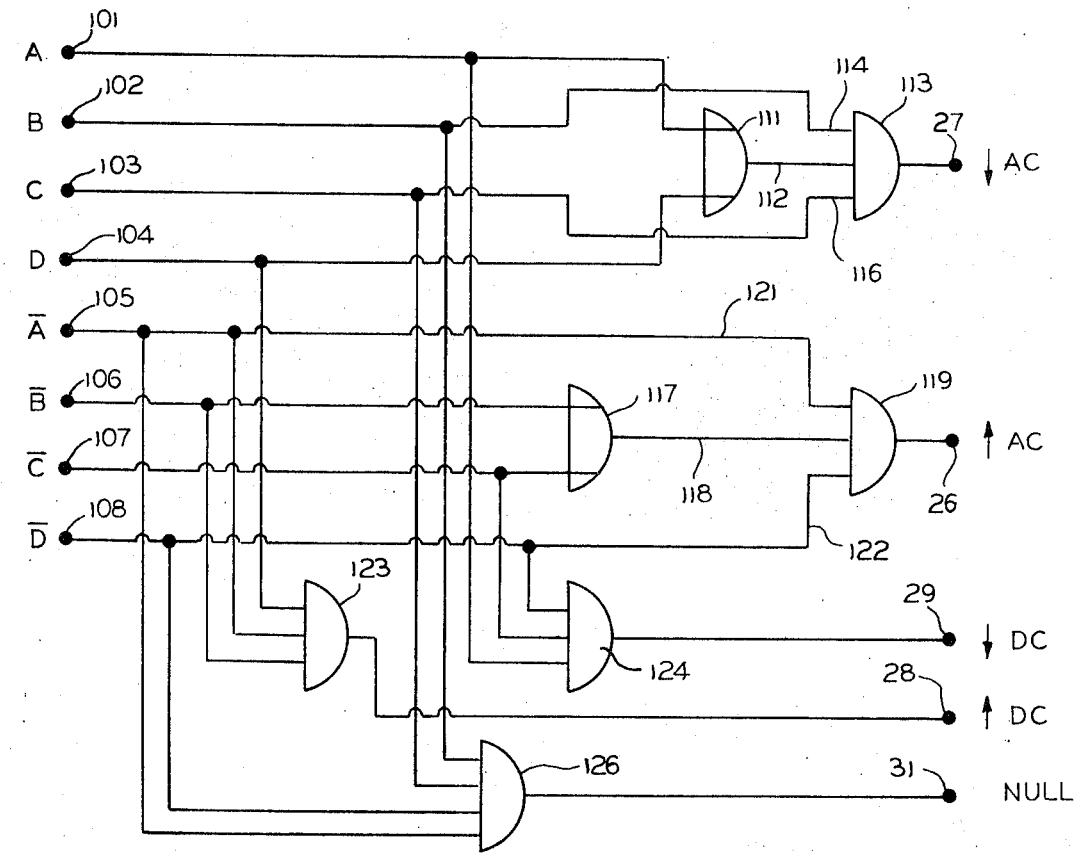
FIG. 5 shows in block diagram form exemplary logic circuitry used to generate digital control signals as a function of the error read by the transducers.

FIG. 5 shows the logical circuitry used to generate the control signals calling for action as indicated by the logical representation of the Table. The logic circuitry is a result of simplified logic equations for the thirteen cases. It should be noted from Table I that cases 1, 5 and 13 generate the same logical representation and accordingly the same action requirement; that is, in this example, increase the alternating current signal. Case 4 also calls for an increase in alternating current signal and is distinguishable from cases 1, 5 and 13 only in that B rather than $\bar{B}$ appears. Hence, logically $\bar{A} \times \bar{C} \times \bar{D}$ requires an increase in the AC signal independent of the logic state of B.

Similarly, an examination of cases 1, 5 and 13 of Table I in conjunction with case 10 shows that $\bar{A} \times \bar{B} \times \bar{D}$ requires an increase in AC regardless of the logical status of C. Combining these two facts yields a single logical relation calling for an increase in AC; namely, $\bar{A} \times \bar{D} \times (\bar{B} \cdot \bar{C})$ calls for an increase in AC (the "x" and the dot have the conventional meaning; namely, logical coincidence and logical alternates, respectively.)

Similarly, it can be readily seen that the following expressions summarize conditions for decreasing AC: $(A \cdot D) \times B \times C$.

Further, it can be shown that the logical summary conditions for increasing and decreasing direct current signals are: $\bar{A} \times \bar{B} \times D$ and $A \times \bar{C} \times \bar{D}$, respectively.

The condition for a null is $\bar{A} \times B \times C \times \bar{D}$. A null, of course, indicates that no further action is to be taken.

The control signal generator of FIG. 5 has inputs 101 thru 108 for Schmidt trigger outputs A, B, C, D, $\bar{A}$, $\bar{B}$, $\bar{C}$, and $\bar{D}$, respectively. The outputs of the control signal generator provide logical commands for increasing or decreasing the alternating current and the direct current signals or for indicating the null condition.

These commands are coupled to the integrators of FIG. 1. However, it should be understood that these signals may be used in other type of circuits, and thus the transducer and error control signal generator of block 12 can be used apart from the circuitry of FIG. 1. In the exemplary control circuit of FIG. 1, the amplitudes of the AC and DC signals which are supplied to the oscilloscope are a function of the control signals supplied to the amplitude programable oscillator, 13. A determination of the magnitude of the signal supplied to the oscilloscope by independent measuring means, such as well known automatic digital volt meters, can yield the required information on the calibration; that is, the actual voltage used to obtain the display amplitude resulting in the null condition. For example, when the scope is set for 10 centimeters/volt and the display amplitude is 4 centimeters, then the voltmeter should measure 40 volts. The voltmeter measurement enables determination of how much the oscilloscope is off calibration or if it is sufficiently on calibration.

In addition, the signals received from the logic circuitry of FIG. 5 can be used to control programable attenuators. The movement of the attenuators in response to the logical commands could automatically provide the magnitude of the signals supplied at the input of the scope. Thus, the transducers and error indication on control signal generator of block 12 is capable of at least two applications. One application is the automatic nulling to provide the calibration error, and the second application is the measurement of an input wave automatically through the readings of the programable attenuators.

Turning now to the actual logic circuitry shown in FIG. 5, note that conventional AND and OR circuits are used. These perform the logical cross and dot product operations previously mentioned. Thus, from the Table I and FIG. 5, it can be seen that the inputs on terminals 101 and 104 are fed into OR gate 111 to provide an output A·D on wire 112.

The output of OR gate 111 is fed to AND gate 113 which has three inputs, 112, 114 and 116. The input 114 is connected to B terminal 102 while the input 116 is connected to C terminal 103. Thus, the output of AND gate 113 is terminal 27 of block 12 which is the logical condition (A·D) × B × C that requires a decrease in AC (indicated by the AC and the arrow pointing downward next to the terminal 27).

A second OR gate 117 is connected to $\bar{B}$ and $\bar{C}$ terminals 106 and 107, respectively. Thus, the output 118 from OR gate 117 is the logical representation $\bar{B} \cdot \bar{C}$. This output is connected to second AND gate 119. This AND gate also has three inputs; one input 121 is coupled to $\bar{A}$ terminal 105. Input 122 is coupled to the $\bar{D}$ terminal 108. The output of AND-gate 119 is terminal 26 of block 12 in FIG. 1. It indicates a logic condition $\bar{A} \times \bar{D} \times (\bar{B} \cdot \bar{C})$ which requires an increase in the AC signal as indicated by the "AC" with the arrow pointing upward next to the terminal 26.

The AND gate 123 is connected to terminals 104, 105 and 106. Thus, its output which is connected to terminal 28 is equivalent to $\bar{A} \times \bar{B} \times D$ and it signals for an increased direct current signal, as indicated by the "DC" and upward pointing arrow next to terminal 28.

The AND gate 124 is connected to terminals 101, 107 and 108. Its output is connected to terminal 29 and is the logical equivalent of $A \times \bar{C} \times \bar{D}$. The signal at terminal 29 is used to indicate the necessity for a decreased direct current signal as indicated by the arrow pointing down and the letters "DC" next to terminal 29.

The null condition is signalled when there is an output from AND gate 126. AND gate 126 is connected to terminals 102, 103, 105 and 108 to indicate $\bar{A} \times B \times C \times \bar{D}$. The output of AND gate 126 is connected to terminal 31 to indicate the null condition.

Thus, an output from AND gate 113 signals for a decreased AC; an output from AND gate 119 signals for an increased AC; an output from AND gate 123 signals for an increased DC, an output from gate 124 signals for a decreased DC; and an output from gate 126 indicates the null condition.

Variations of the above logic circuitry will be obvious to those skilled in the art. It is intended therefore, that the above description of the logic circuitry merely be exemplary to broadly show the use of sensors placed upon the oscilloscope face to read the desired parameters and the use of the logic circuits to derive coded control signals from the sensors so placed. Thus, the sensors generate a signal responsive to detecting illumination caused by the signal displayed on the face of the scope. The signal from the sensor is amplified and converted into a coded signal by the trigger circuits indicated in FIG. 3. The coded signals are utilized in logic circuitry to generate the control signals desired to supervise the signal generator used in supplying test signals to the oscilloscope.

The description of FIG. 1 hereinbefore has assumed DC coupling between the equipment lying in the path from the oscillator to the oscilloscope. However, AC coupled equipment can be used, including AC coupled amplifiers in the scope, with certain additional circuitry. This additional equipment is shown in FIGS. 6 or 7.

When AC coupling is used, then line 15 is opened, by breaking the link 129 between terminals 127 and 128. Normally, these terminals are connected with a wire link indicated by a dashed line 129. The equipment of FIGS. 6 or 7 is inserted between terminals 127, 128 instead of wire link 129. Thus, means are provided for enabling simulated DC offset signals to be supplied to the oscilloscope even when the equipment connected to the oscilloscope or the oscilloscope itself is AC coupled.

Figure 6:
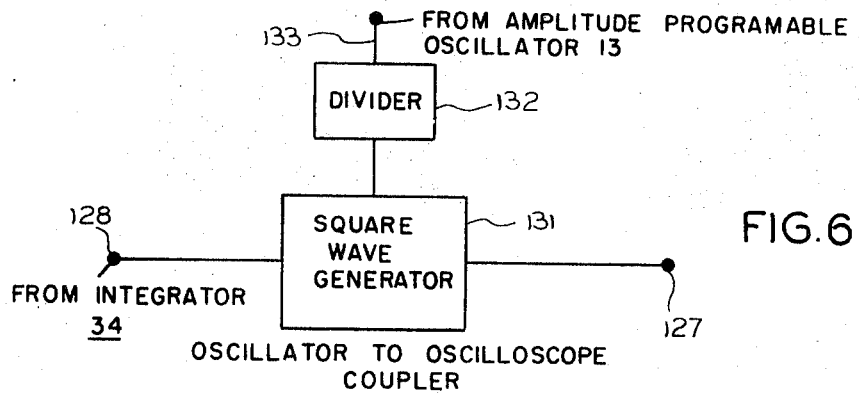
FIG. 6 shows in block diagram form equipment used in conjunction with the equipment of FIG. 1 when AC coupling is used between the oscillator and the circuits of the oscilloscope being calibrated.
Figure 7:
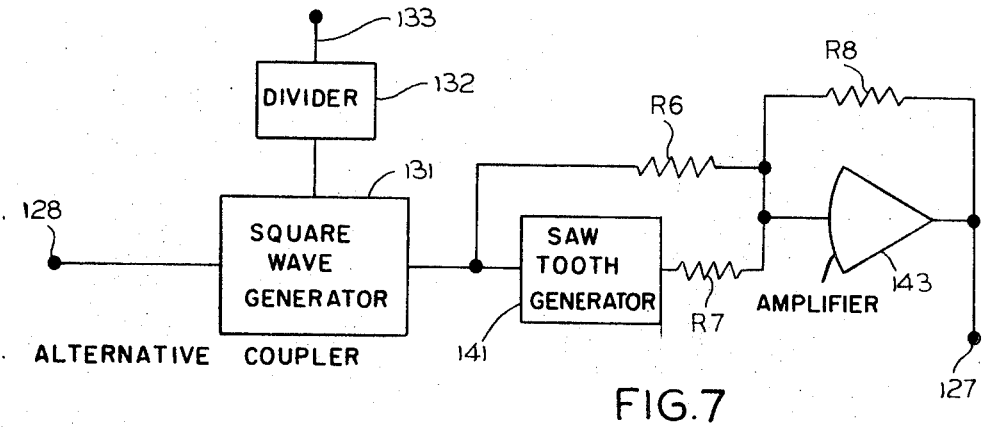
FIG. 7 is a block diagram of alternative equipment used in conjunction with the equipment of FIG. 1 when AC coupling is used between the oscillator and the circuits of the oscilloscope being calibrated.

More particularly, as shown in FIGS. 6 and 7, a square wave generator 131 is connected to receive the signal from integrator 34 at terminal 128. The square wave generator 131 also receives another input in the form of a signal from the amplitude programable oscillator 13 through divider 132. The divider is coupled to the output of the oscillator 13 through wire 133.

The amplitude of the signal from the square wave signal generator 131 is controlled by the output of integrator 34. The frequency of the signal from the square wave generator is controlled by the output of divider circuit 132, and accordingly, by the frequency of the oscillator 13.

Figure 8:
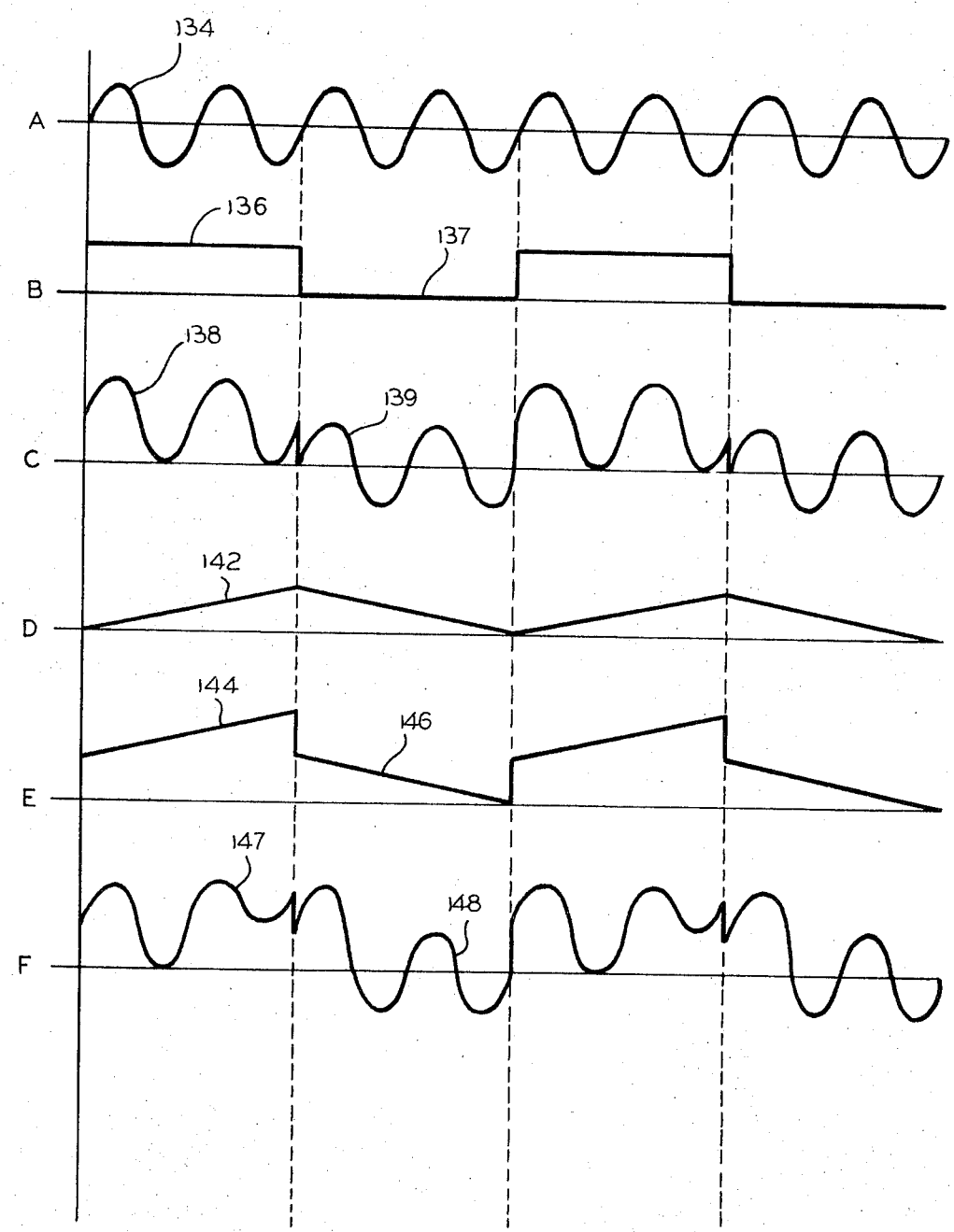
FIG. 8 illustrates in portions A, B, C, D, E and F various wave forms found in the system.

The square wave generator acts to offset the output of oscillator 13 during the non-zero amplitude portion of the square wave. Thus, as shown in FIG. 8 at A, the normal output from oscillator 13 is sine wave 134. The square wave output of the square wave generator which is an input to the oscillator 13 at terminal 16; the DC offset input is shown at B in FIG. 8. The square wave has a high level 136 and a zero level 137.

In an exemplary embodiment, the circuit 132 divides by 4. Thus, a complete cycle of the square wave occurs during four cycles of the oscillator 13. The high level 136 occurs during a preceding two cycles of oscillator 13 output and the zero level 137 occurs during a succeeding two cycles. The combined output of oscillator 13; that is, with the square wave input, is shown at C in FIG. 8. Therein, a portion of the sine wave 138 is offset from the zero line. That is, the sine wave is raised by the amplitude of the raised portion of the square wave 136. The amplitude of the raised portion of the sine wave is a function of the output of integrator 34. During the next half of the square wave cycle, the sine wave shown as 139 is again returned to its normal position where it varies about the zero axis. This process continues as long as the square wave generator operates.

It should be understood that while the example illustrates the use of a divide by four circuit, it could be any other integer as desired in a particular application. The key to the number used as a divisor is to assure that the DC-simulating component of the displayed wave from the oscillator is varied sufficiently fast to enable its accurate passage through the AC couplings. Evidently, the composite wave C is transmitted through the AC couplings, thereby circumventing the previously discussed difficulty and overcoming the necessity of utilizing only DC coupling.

The first part of the sine wave 138 is offset vertically as a function of the DC output from integrator 34, while the sine wave in the second part 139, which is assumed to lie outside the purview of the sensors, provides means for "fooling" the AC coupling and at the same time, provides a coarse visual indication of how much DC correction is required for the initial offset, and of course, how much is being inserted by the automatic system.

Another problem arising with AC coupling is that the AC coupling time constant of most oscilloscopes is insufficiently long to prevent "droop" in the composite wave C when it is transmitted through the coupling circuitry. More particularly, many scopes employ a 1/10 microfarad capacitor and a one megohm input resistor resulting in a 1/10 second input coupling time constant. If the frequency of 1,000 cycles per second is to be used, as is more or less standard, for the oscillator 13 output, and if the divider circuit 132 is dividing by four, then the square wave will go through one complete cycle every 4 milliseconds. Computation reveals a "droop" or change during one half period of the square wave of approximately 2 percent. This is just large enough to disturb the calibration accuracy that would ordinarily be required. When a relatively high accuracy is required, the circuitry of FIG. 7 is used in place of the circuitry of FIG. 6, to correct the "droop" when the coupling time constants in the oscilloscope are insufficiently long compared with the oscillator frequency. (For a coupling time constant equal to one thousand oscillator periods for example, the implementation of FIG. 6 yields a droop of only two tenths of a per cent, which is reasonable in terms of typical scope accuracy, However, for a ratio of only one hundred as in the case assumed above, — 1 kHz and 1/10 second, — the droop is too great and the circuitry in FIG. 7 should be used).

FIG. 7 operates similarly to FIG. 6, except in addition, the output from the square wave generator is applied to a saw tooth or triangle wave generator 141. Wherever possible, the reference nemerals of FIG. 7 are the same as those of FIG. 6.

The triangle wave generator 141 generates the triangular wave of the kind shown in FIG. 8 at D; namely, wave 142. The triangular wave and the square wave are added using the additional circuitry shown in FIG. 7. The outputs of the generator 131 and generator 141 are coupled to operational amplifier 143 through resistors R6 and R7 respectively. The operational amplifier 143 is bridged by feedback resistor R8.

The output of the operational amplifier, which is the composite total wave form is connected to terminal 127. The composite wave obtained at the output of operational amplifier 143 which is connected to terminal 127 is shown at E on FIG. 8. It is a square wave ramp or "squamp".

It should be noted that for simplicity, the inversion in amplifier 143 has been omitted. It may be eliminated to obtain wave E, for example, by applying waves of opposite polarity to the input of amplifier 143. In fact in view of the fact that commercially available generators, such as generators 131 and 141, typically generate waves of either polarity, there is no problem encountered in using waves of opposite polarity.

Alternatively, the opposite polarity can be provided by utilizing a polarity inverter following amplifier 143. The polarity inverter could be another operational amplifier having equal input and feedback resistors.

The "squamp" wave of E is then used instead of the square wave B of FIG. 8 for application to the DC offset input to oscillator 13. Then the output of the oscillator is the composite squamp sine wave shown as F in FIG. 8. In effect then, the ramp added to the square wave compensates for the droop in the AC signal coupled to the input of the scope, since that droop is essentially linear in the first small portion of the wave. (The first small portion of an exponential is essentially a straight line).

The versatility of the system is emphasized when it is noted that the same general method of calibrating the vertical axis of the scope can be applied to scopes that have horizontal amplifiers that are intended primarily or even secondarily for use with external signals. Then, the scope reader assembly (sensor array) would be rotated 90°, and the input signal would be applied to the X input rather than to the Y input terminals. All of the rest of the operations would be unchanged.

The method and basic equipment described hereinbefore can also be used in calibrating the time base of the scope or horizontal amplifiers of the scope. The time base is usually determined by sweep voltages generated within the scope itself. Such time bases are typically calibrated by applying pulse trains of known spacing to the vertical amplifier input. (y axis deflections) and measuring the spacing in the horizontal or axis direction between the pulses. The measurements are then related to the setting of the time base controls or switches on the scope to test the calibration of the scope, relative to the time base.

Figure 9:
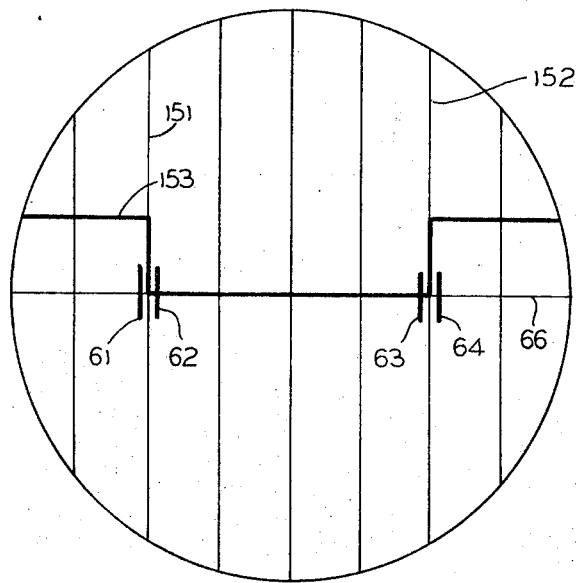
FIG. 9 illustrates the transducers mounted for monitoring the horizontal or time axis of the oscilloscope.
Figure 10:
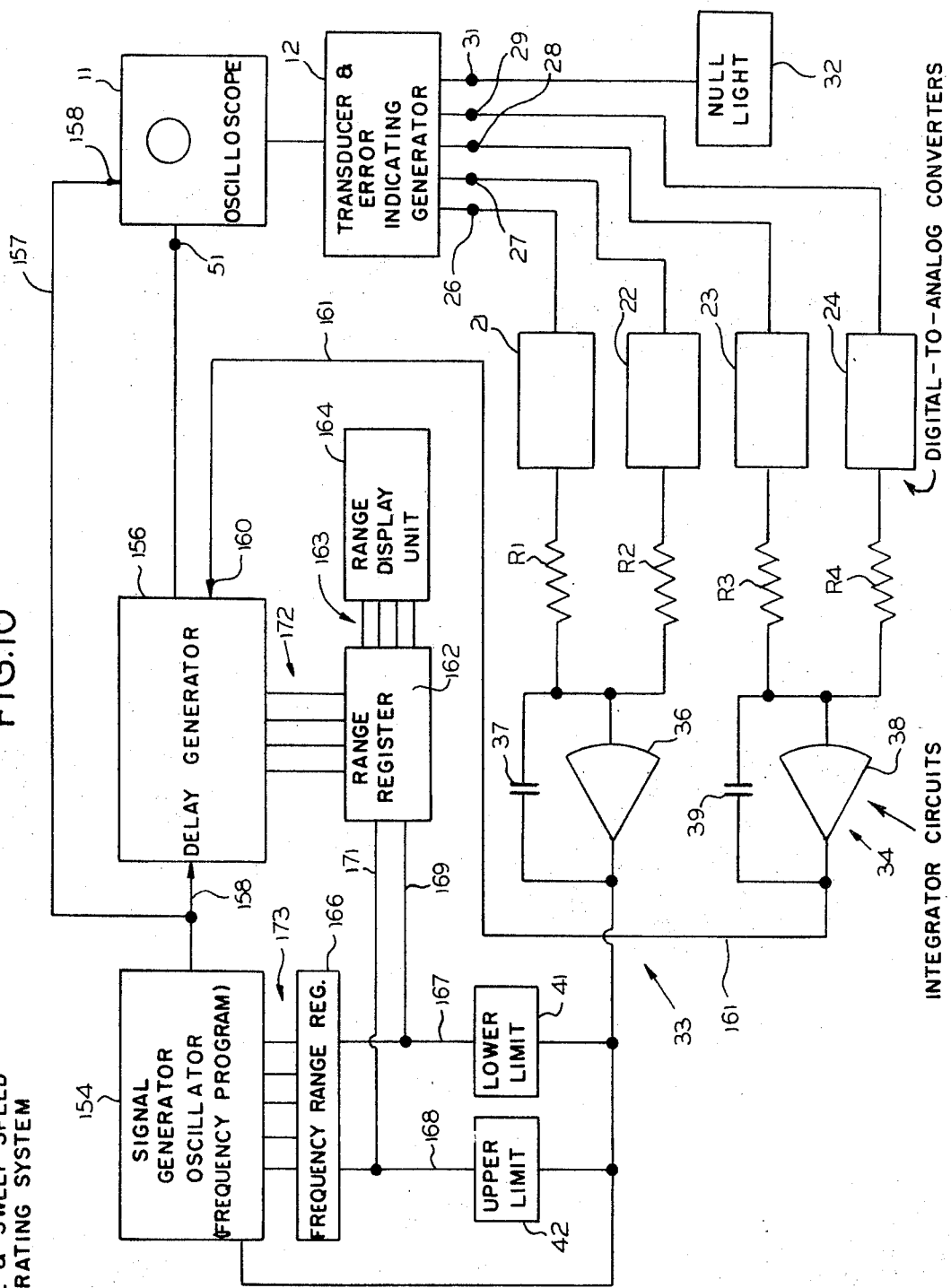
FIG. 10 is a block diagram showing of the oscilloscope reader and calibration system when used for calibrating the time base and sweep speed of the oscilloscope using the transducer arrangement of FIG. 9.

FIGS. 9 and 10 show how such calibration can be accomplished using the system disclosed. In order to accomplish a time base calibration in a manner analogous to that described with regard to the calibration of vertical deflection, it is necessary to reposition the previously utilized sensor array or to provide auxiliary sensors.

FIG. 9 shows the position of the four sensors of the array repositioned from the location in FIG. 2. Vertical grid lines are shown instead of the horizontal grid lines of FIG. 2. The sensors are applied so that their longitudinal axes are normal to the zero grid line 66. The sensors are again arranged in pairs with the left hand pair positioned on either side of vertical grid line 151, and the right hand pair positioned on either side of vertical grid line 152.

A square wave is applied to the vertical input of the scope. This is indicated as square wave 153. The input could just as well be pulses occurring at the leading and trailing edge locations; that is, at the vertical lines 151 and 152, for example. Such an input would work for manual calibration. However, for automatic calibration with the system sensors as described, a square wave 153 shaped as shown is desirable. Other sensor locations, shapes and other wave forms are possible.

FIG. 10 shows in block diagram form the circuitry utilized for calibrating the time base of the scope. Here again, wherever possible, the reference numerals of FIG. 1 are used. For example, once again, scope 11 is shown connected to transducer and error indication generator 12. The error indication generator 12 is shown as having five terminals making up its output. They are terminals 26, 27, 28, 29 and 31 which indicate respectively, increase AC, decrease AC, increase DC, decrease DC and a null condition. The terminals 26, 27, 28 and 29 of block 12 are coupled to the digital to analog converers 21, 22, 23 and 24, respectively. These converters are coupled into the integrating circuits 33 and 34. The integrating circuits are the same ones shown in FIG. 1 and comprise the operational amplifiers 36, 38 bridged by feedback capacitors 37, 39, respectively. Coupling resistors R1, R2, R3 and R4 are used for coupling the converters 21, 22, 23 and 24 to the integrating circuits 33 and 34 with the AC converters being coupled to integrator 33 and the DC converters being coupled to integrator 34.

Instead of the amplitude programable oscillator and the amplitude range circuits of FIG. 1, there are provided a frequency programable oscillator 154 and a programable delay generator 156. These devices enable variations in signal frequency and inter-signal delays in place of the amplitude and range variations previously discussed.

The output of the frequency programable oscillator 154 is coupled to the delay generator 156 through conductor 157 and also to the synch input 158 on scope 11. The output of the delay generator is coupled to the scope input terminal 51.

Thus, delay means are provided for delaying the start of the input signal after the time base generator of the oscilloscope is triggered. The programable delay generator is also coupled to the output of integrator 34 through cable 161. The programable delay generator 156 is further controlled by the range register, 162. The range is displayed through lines 163 on range display unit 164. This enables an immediate determination of the range being used. For example, one microsecond per centimeter is one range setting. The delay within each range is set through the input programing terminal 160 coupled to integrator 34 with cable 161.

The output of delay generator 156 in the exemplary arrangement is a square wave equal in frequency to that received from oscillator 154, but delayed an amount programed by the delay generator 156. Its position on the screen is detected by the sensor array shown in FIG. 9. The error indication or control signal generator 12 translates the outputs of sensors 61—64 into control signals.

The logic circuitry of block 12 generates what were previously known as increase AC, decrease AC, increase DC and decrease DC command signals on the terminals, 26—29 along with a null signal on terminal 31. AC increase and decrease signals now are used as commands for oscillator time period variations. In the case of the so called DC commands, they are now used to control the variations in the leading edge delay.

The output of integrator 33 coupled to the frequency programable oscillator 154 varies the frequency of the oscillator inversely with the input voltage amplitude. That is, increasing voltage causes the period of the oscillator output signal to increase; or causes the frequency of the oscillator output signal to decrease.

If the oscillator operates to increase frequency as a direct function of the programable oscillator input signal amplitude, then the digital to analog converters 21, 22 outputs can be polarity inverted so that the output of the integrator 33 decreases for an increase command, and conversely.

The output from the delay command integrator 34 is applied to delay generator 156 to cause an increase in a multivibrator delay period responsive to an increased amplitude signal. Thus, the delay is proportional to the DC programing input signal applied to terminal 60.

As was explained in connection with the vertical calibration system, the output of the amplifier 36 is monitored by low and high limit comparators, 41 and 42, respectively, The outputs of the high and low limit circuits are applied to an oscillator frequency range register 166 through cable wires 167 and 168, respectively. Thus, the high and low limit circuits cause the register to change the range of the frequency programable oscillator 154. At the same time, the signals from the high and low limit circuits are applied to the delay generator range register 162 to control the switching of the range of the delay generator over wires 169 and 171, respectively. The range register controls the delay generator over coupling connections 172. The frequency program register 166 controls the range of the frequency programable oscillator 154 over wires 173.

Thus, in operation, to calibrate the scope, a fixed amplitude frequency programable oscillator signal is applied through the delay generator to the vertical input 51 of the scope. At the same time, the frequency programable oscillator signal, undelayed, is applied to the synch input terminal 158 of the scope. The scope controls are set for a range, for example, of 1 microsecond or 10 microseconds per centimeter, where the period of the known signal applied is such that the sensors 61, 64 should not detect any illumination and the 62 and 63 should detect illumination since the vertical portions of the square wave should lie between the pairs of sensors. If indeed the signal lies between the sensors, then there is a null condition and no change in the output of the programable oscillator frequency or the programable delay generator is necessary. However, for various other conditions, then the frequency programable oscillator frequency will be varied and the programable delay generator will also be varied until the null condition is reached. Then, time duration measurements taken automatically or manually at terminal 51 determine the calibration error.

While the principles of the invention have been described above in connection with specific apparatus and applications it is to be understood that this description is made only by way of the example and not as a limitation on the scope of the invention.

What is claimed is:

1. An oscilloscope reading and calibration system for automatically determining the calibration error of oscilloscopes, said system comprising at least one closed loop including a programable signal generator for producing test signals as a function of input control signals, means for coupling said test signals to an input of an oscilloscope being calibrated, oscilloscope reading means for automatically reading the displayed signals on the face of said oscilloscope, control signal generating means operated responsive to signals received from said reading means for generating either input control signals or null signals responsive to the displayed signals being either out of certain defined boundaries on the oscilloscope face or being within certain defined boundaries on said oscilloscope face, respectively, means for closing said loop by coupling said control signals to said programable signal generator to vary the test signals until the null signal is produced, and means for measuring the test signal resulting in the null signal to determine any calibration error.

2. The oscilloscope reading and calibration system of claim 1, wherein said means for coupling said test signals to the oscilloscope being calibrated comprises; buffer amplifier means serially connected between said signal generator and the input of said oscilloscope.

3. The oscilloscope reading and calibration system of claim 2, wherein direct current coupling means are used in coupling the signal generator output to the oscilloscope circuitry being calibrated.

4. The oscilloscope reading and calibration system of claim 1, wherein said means for coupling test signals to the oscilloscope being calibrated comprises range changer means serially connected between the signal generator and the oscilloscope input to vary the amplitude range of the test signals to correspond to the range set by the controls of said oscilloscope.

5. The oscilloscope reading and calibration system of claim 4, wherein range changer control means are provided for controlling said range changer means, said range changer control means being operated as a function of the amplitude of the input signals received from the control signal generating means.

6. The oscilloscope reading and calibration system of claim 5, wherein display means are provided for indicating the range of the signal received from said range changer means, and said range display means being operated responsive to signals from said range changer control means.

7. The automatic system of claim 5 wherein said oscilloscope reading means comprise silicon solar cells attached directly to the scope face.

8. The automatic system of claim 7, wherein said silicon solar cells are in the order of ten to twenty thousandths of an inch in height and ½ to 1 inch in length.

9. The automatic system of claim 8, wherein said silicon solar cells are arranged in an array including at least two pair of said solar cells, said pairs of solar cells spaced apart from each other by a given distance, each of said solar cells of said pair of solar cells being spaced apart from each other by an amount in the order of five thousandths of an inch.

10. The automatic system of claim 7, and means for converting the output signals of said solar cells to coded signals.

11. The automatic system of claim 10, wherein said converting means comprises Schmidt trigger circuit means.

12. The oscilloscope reading and calibration system of claim 6, wherein said range changer means comprises variable attenuator means, and wherein said range changer control means comprises means for switching the contact point of the output of said attenuator means.

13. The oscilloscope reading and calibration system of claim 1, wherein said oscilloscope reading means comprises an assembly of transducer means amenable for mounting on the face of the oscilloscope being calibrated, said transducer assembly being positioned to determine desired parameters of the signal being displayed on the oscilloscope face.

14. The oscilloscope reading and calibration system of claim 13, wherein said transducers comprise optical sensors.

15. The oscilloscope reading and calibration system of claim 14, wherein said optical sensors comprise silicon solar cells.

16. The oscilloscope reading and calibration system of claim 15, wherein said silicon solar cells are positioned to determine the calibration of the vertical amplifier of the oscilloscope, a first pair of said cells being positioned vertically spaced apart from each other at a certain predetermined spacing, a second pair of silicon cells being positioned vertically spaced apart from each other at said predetermined spacing, said first and second pairs of cells being vertically spaced apart from each other a certain predetermined distance, whereby in a null position of the system a peak-to-peak display on the oscilloscope provides illumination on the inner two cells and no illumination on the outer two cells.

17. The oscilloscope reading and calibration system of claim 16, wherein said solar cells are in the order of ten to twenty thousandths of an inch in the scope vertical direction and in the order of ½ to 1 inch in the horizontal direction, and wherein said cell to cell spacing of said pairs is in the order of five thousandths of an inch.

18. The calibration reading and calibration system of claim 15, wherein said silicon solar cells are positioned to determine the calibration of the horizontal amplifier of the oscilloscope being calibrated, a first pair of said silicon solar cells being positioned horizontally spaced apart from each other at a certain predetermined spacing, a second pair of silicon solar cells being positioned horizontally spaced apart from each other at said certain predetermined spacing, said first and second pair of cells being horizontally spaced apart from each other a certain predetermined distance, whereby the wave displayed on said oscilloscope at the time of the null condition lies between the inner solar cells of each of said pairs.

19. The oscilloscope reading and calibration system of claim 13, wherein said transducer assembly means comprises transducers having their outputs connected to means for providing coded signals responsive to said transducers being activated by signals displayed on the oscilloscope face.

20. The oscilloscope reading and calibration system of claim 19, wherein said means for providing coded signals comprise trigger circuits having digital outputs.

21. The oscilloscope reading and calibration system of claim 20, wherein said trigger circuits are Schmidt trigger circuits and wherein said digital outputs are binary coded digital outputs.

22. The oscilloscope reading and calibration system of claim 20, wherein the output of said trigger circuits are connected to logic circuitry to provide control signals for controlling said programable generator responsive to the outputs received from said trigger circuits.

23. The oscilloscope reading and calibration system of claim 22, wherein said programable signal generator is a programable amplitude signal generator having an alternating current-control input and a direct current-control input, the amplitude of the output signal of said generator being a function of the amplitude of the alternating current-control input and the DC component of the output signal being a function of the direct current-control input, said logic circuitry providing first digital control signals for the alternating current-control input and second digital control signals for the direct current-control input, first digital-to-analog converter means for converting said first digital control signals to first analog control signals, second digital-to-analog converter means for converting said second digital control signals to second analog control signals, first integrator circuit means coupled to the alternating current-control input and operated responsive to said first analog control signals for providing amplitude control signals, and second integrator circuit means coupled to the direct current-control input and operated responsive to said second analog control signals for providing DC offset control signals.

24. The oscilloscope reading and calibration system of claim 23, wherein said programable amplitude signal generator is a programable frequency signal generator, and wherein the alternating current-control input controls the frequency of the signal generator output signal and the direct current-control input controls the signal delay time of the output signal of said signal generator.

25. The oscilloscope reading and calibration system of claim 22, wherein said transducer assembly comprises four transducers, each of said transducers being coupled to one of said trigger circuits, each of said trigger circuit comprising a pair of outputs, whereby there is an A and an $\overline{A}$ output for the first trigger circuit, a B and a $\overline{B}$ output for the second trigger circuit, a C and a $\overline{C}$ output for the third trigger circuit and a D and a $\overline{D}$ output for the fourth trigger circuit, first OR gate means operated responsive to receiving a signal from either the A output or the B output for providing a first OR gate output signal, first AND gate means operated responsive to simultaneously receiving signals from said first OR gate means, said B output and said C output, the output of said first AND gate being used to control said programable generator means to decrease the AC signal therefrom, second OR gate means operated responsive to receiving either a $\overline{B}$ signal or a $\overline{C}$ signal for providing an output from said second OR gate means, second AND gate means operated responsive to simultaneously receiving signals from said $\overline{A}$ output, said $\overline{B}$ output and said second OR gate means to provide a second AND gate output signal, said second AND gate output signal being used to control said generator means to increase the AC amplitude of the output signal of said programable generator means, third AND gate means operated responsive to simultaneously receiving an $\overline{A}$ signal, a C signal and a $\overline{D}$ signal to provide a third AND gate signal output, the third AND gate signal output being used to control said programable generator to decrease the DC position of the output of said programable generator, fourth AND gate means operated responsive to simultaneously receiving a D signal, an $\overline{A}$ signal and a $\overline{B}$ signal to provide fourth AND gate output signals, the said fourth AND gate output signals being used to control said generator to increase the DC position of said output signal, and fifth AND gate means operated responsive to simultaneously receiving a B signal, a C signal, an $\overline{A}$ signal and a $\overline{D}$ signal for indicating that the loop circuit has reached a null condition.

26. The oscilloscope reading and calibration system of claim 22, wherein the output of said logic circuitry are digital signals, and wherein digital-to-analog converter means are coupled to the output of said logic circuitry to convert said digital signals to analog signals for controlling the programable signal generator.

27. The oscilloscope reading and calibration system of claim 26, wherein means are provided at the output of said digital-to-analog converter means for historically summing the analog signals provided by the digital-to-analog converter means, and said summing means comprising integrator circuitry.

28. The oscilloscope reading and calibration system of claim 27, wherein alternating current coupling means are used for connecting the signal generator output to the oscilloscope circuitry being calibrated.

29. The oscilloscope reading and calibration system of claim 28, wherein means are provided for transmitting the DC signal variations through said alternating current coupling means.

30. The oscilloscope reading and calibration system of claim 29, wherein said means for transmitting the DC signal variations through the AC coupling means comprises a square wave generator means in the means for closing said loop, said logic circuitry providing AC control signals and DC control signals, said integrator circuitry comprising first integrator means connected for summing said AC control signals, and second integrator means connected for summing the DC control signals, the summation of said DC control signals determining the amplitude of the square wave output of said square wave generator, means for coupling an input of the square wave generator to the output of said signal generator for controlling the frequency of said square wave generator, and said last named means comprising divide circuit means for controlling the output of said square wave generator frequency to be a fraction of the frequency of the output of said signal generator.

31. The oscilloscope reading and calibration system of claim 30, wherein means are provided for compensating for the AC coupling droop.

32. The oscilloscope reading and calibration system of claim 31, wherein said droop compensating means comprises a squamp generator, said squamp generator including a ramp generator operated responsive to the receipt of the square wave signal of said square wave generator, means for combining the output of said ramp generator and said square wave generator, said combining means comprising an operational amplifier, and means for coupling the output of said operational amplifier to the signal generator.

33. An automatic system for reading displays on an oscilloscope face and for generating control signals in response to the displayed signals, said system comprising silicon solar cell optical sensor means to provide electric signals responsive to said display being within the purview of said optical sensor means, said silicon solar cells being in the order of ten to twenty thousandths of an inch in height and ½ to 1 inch in length, means for attaching said optical sensors to the scope face in a sensor array including two pair of said sensors, said pairs of sensors being spaced apart from each other by a given distance, each sensor of said pair of sensors being spaced apart from each other by an amount in the order of five thousandths of an inch, said optical sensors providing electric signals responsive to juxtaposed illuminated signal displays on the face of said oscilloscope, Schmidt trigger means for converting said electric signals into binary control signals, and logical circuit means wherein said binary signals are utilized to operate said logic circuitry to provide signals indicating control steps to be taken in correcting the input signal to the said oscilloscope to change the display on said oscilloscope until a desired display has been obtained.

34. The automatic system of claim 33, wherein said logic circuitry provides: first digital signals representing orders to increase the alternating current of the input signals to the oscilloscope, second digital signals representing orders to decrease the alternating current of the input signals to the oscilloscope, third digital signals representing orders to increase the DC positioning signal to the oscilloscope, and fourth digital signals representing orders to decrease the DC positioning signal of the input signal to the oscilloscope.

35. The automatic system of claim 33, wherein four sensors are used, each of said sensor means being coupled to one of said trigger circuits, each of said trigger circuits providing a binary signal, said binary signals comprising an A signal, a $\overline{A}$ signal, a B signal, a $\overline{B}$ signal, a C signal, a $\overline{C}$ signal, a D signal and a $\overline{D}$ signal from said four trigger circuits, respectively, said logic circuitry comprising a first OR gate means operating responsive to either the A signal or the D signal to provide a first OR gate output signal, first AND gate means operated responsive to simultaneously receiving the B signal, the C signal, and the first OR gate signal to provide a first AND gate output signal, the first AND gate output signal indicating the AC input signal of said oscilloscope must be decreased, second OR gate means operated responsive to receiving either the $\overline{B}$ signal or the $\overline{C}$ signal to provide second OR gate output signal, second AND gate means operated responsive to simultaneously receiving the $\overline{A}$ signal, the $\overline{D}$ signal and the second OR gate output signal to provide a second AND gate output signal, the second AND gate output signal indicating that an increase in the AC input signal of said oscilloscope is required, third AND gate means operated responsive to simultaneously receiving the A signal, the $\overline{C}$ signal and the $\overline{D}$ signal for providing a third AND gate output signal, the third AND gate output signal indicating that a decrease in the direct current input signal to oscilloscope is required, fourth AND gate means operated responsive to the simultaneous receipt of the D signal, the $\overline{A}$ signal, and the $\overline{B}$ signal for providing a fifth AND gate output signal indicating that an increase in the direct current signal input to the oscilloscscope is required, and a fifth AND gate means operated responsive to simultaneous receipt of the B signal, the C signal, the $\overline{A}$ signal, and the $\overline{B}$ signal for providing a fifth AND gate output signal indicating that no changes in the input signals to the oscilloscope are required.

* * * * *